United States Patent [19]
Paul et al.

[11] 3,872,201

[45] Mar. 18, 1975

[54] METHOD OF CURING FOAM INFLATED TIRES

[75] Inventors: David H. Paul, Akron; Joseph A. Rosey, Stow, both of Ohio

[73] Assignee: The Goodyear Tire & Rubber Company, Akron, Ohio

[22] Filed: Sept. 19, 1973

[21] Appl. No.: 398,617

Related U.S. Application Data

[63] Continuation of Ser. No. 42,581, June 1, 1970.

[52] U.S. Cl.................. 264/55, 152/313, 156/79, 156/113, 264/45, 264/236, 264/321, 264/347
[51] Int. Cl.......................... B29d 27/00, B60c 7/00
[58] Field of Search......... 264/45, 46, 55, 236, 321, 264/347; 152/310, 311, 312, 313; 156/79, 113

[56] References Cited
UNITED STATES PATENTS

| | | | |
|---|---|---|---|
| 3,022,810 | 2/1962 | Lambe | 152/157 |
| 3,381,735 | 5/1968 | Talcott et al. | 152/313 |
| 3,398,218 | 8/1968 | Richmond | 264/45 |
| 3,650,865 | 3/1972 | Hawkes et al. | 264/45 X |

*Primary Examiner*—H. S. Cockeram
*Attorney, Agent, or Firm*—F. W. Brunner; H. E. Hummer

[57] ABSTRACT

A method for expanding and curing foamable elastomeric material which is placed within the cavity of a previously molded tire. The tire, filled with foamable rubber material, is mounted on a wheel rim and contacted with steam in an elemental oxygen-free atmosphere to simultaneously foam and cure the elastomeric material within the tire cavity.

6 Claims, No Drawings

METHOD OF CURING FOAM INFLATED TIRES

This is a Continuation, of application Ser. No. 42,581 filed June 1, 1970.

BACKGROUND OF THE INVENTION

The invention is especially suitable for producing large tires used in off-the-road trucks and earthmoving equipment which, until recently has used pneumatic tires of the tube or tubeless type. Pneumatic tires are susceptible to punctures and blow-outs and must be removed and repaired when such incidents happen. Unfortunately, the use of equipment is lost for a period of time necessary for making the repairs, which is costly and expensive. Tires inflated with foamed elastomeric material, however, are literally deflation-proof and almost indestructible from normal hazards such as rocks and nails, and eliminate or substantially reduce the period of time the equipment is not in operation.

Elastomeric material or resilient foam which may be used successfully for filling large earthmoving tires, can be produced from natural rubber, GR-S, neoprene, acrylonitrile rubber, chlorosulfonated polyethylene, or other rubber-like materials by the addition of a blowing agent which liberates nitrogen, such as dinitrosopentamethylene-tetramine, sulfonyl hydrazides, or N,N'-dimethyl-N,N'-dinitrosoterephthalamide, as described in U.S. Pat. No. 3,022,810. Other suitable material is described in U.S. Pat. No. 3,381,735, especially Examples 1-3 mentioned in the patent.

Many foam filled tires are produced by placing the expandable or foamable material in the cavity of a previously molded or cured tire. The tire is then mounted on a rim and placed in any suitable oven, where hot air or other gas is used to simultaneously expand and cure the material within the tire cavity.

The invention is concerned with an improved method for curing and inflating such tires, and more specifically with providing saturated steam for heating the tire and rim to simultaneously expand and cure the foamable material.

Certain advantages are derived when steam rather than hot gas is used in foaming and curing the material within the tire cavity. For example, steam eliminates or substantially reduces surface oxidation occurring in the cured tire body, such oxidation causing surface cracking similar to weather checking in the tire sidewalls which is undesirable. Moreover, oxidation unduly hardens the surface of the tire. Steam curing also eliminates or substantially reduces a fire hazard normally present when foaming and curing tires with hot air, because there is substantially no elemental oxygen in the atmosphere of saturated steam used in the method of the invention. Moreover, it has been found that there is a greater transfer of heat, because steam is a better heat transfer medium than hot air.

THE INVENTION

A previously molded and vulcanized tire is at least partially filled with any suitable uncured foamable elastomeric material, which is placed within the cavity or hollow of the tire. The tire is then mounted on a rim and placed in any suitable steam autoclave for foaming and curing the material. Saturated steam at a preferred temperature of about 300°F. is moved into contact with the tire and rim to heat the material and consequently expand and cure it. The steam can be in the broad temperature range of from about 212°F. to about 400°F., but it is preferred that the temperature of the steam be in the narrower temperature range of from about 260°F. to about 325°F., since at lower steam temperatures the material within the tire cavity takes longer to foam and cure, and at higher steam temperatures the tire body can quickly overcure, thereby reducing the strength of the reinforcing tire cords, which can be detrimental to the tire. Standard thermocouples are placed within the material and used to monitor the temperature of the foamable insert and indicate when the material is properly foamed and cured, the temperature conditions for curing being previously ascertained in the laboratory by testing samples of the foamable material.

Using this particular method, a 10.00-20 conventional tire was packed with foamable rubber, essentially as described in Example 3 of U.S. Pat. No. 3,381,735, sufficient to produce a finish foam inflated pressure of about 80 p.s.i. The tire with the foamable insert, was then mounted on a rim and suspended by the rim in a conventionally designed pot heater, such that the rubber tire was free of the pot heater. Saturated steam at 300°F., was forced into the pot heater to continuously heat the material within the tire cavity for a period of about 9 hours, after which time the tire was removed and allowed to cool. It has been found that about 50-80 percent of the foam curing takes place immediately after the tire is removed from the pot heater while the tire is still hot, the rubber being an excellent insulator for retaining heat used to continue curing the material within the tire cavity.

Another method, which is preferable to the previously described method, especially in connection with tires inflated with foam to pressures considerably less than the gauge pressure of the processing steam, is to alternately contact the foam filled tire with saturated steam for a predetermined period of time, and then release the steam to let the foam expand. This sequence is repeated until the rubber foam is fully expanded and cured. For example, a similar 10.00-20 tire was likewise filled with foamable rubber, mounted on a wheel rim, suspended by the rim in a pot heater, and exposed to saturated steam at about 300°F. for a period of about 30 minutes. The steam was then released and the foamable rubber allowed to expand at atmospheric pressure for a period of about 60 minutes in an atmosphere generally free of elemental oxygen, since air was not let into the pot heater. The tire was then contacted with saturated steam at about 300°F. for a second period of about 15 minutes. The steam was again released and the tire allowed to similarly set in the pot heater for a period of about 75 minutes. The third and fourth steps of reheating the tire for 15 minutes and allowing the tire to set for 75 minutes, were repeated for a total time period of about 12½ hours, at which time the thermocouples placed within the rubber foam, indicated that the tire was ready for removal from the pot heater. It was found, in the aforementioned case, that the temperature of the foamed insert at its innermost or center point did not exceed 220°F. during the foaming and curing process.

The rate of decomposition of the blowing agent should be faster than the curing rate of the rubber at any given temperature in the range of temperatures used to foam and cure the rubber, because it is important that the material foam completely before it cures. Otherwise, the foamed insert will not be uniform, and hollow spots will develop in the tire causing certain undesirable riding characteristics. The latter mentioned blowing agent generally begins to decompose at a temperature of about 160°F., which is important since, during mixing, a temperature of about 140°–160°F. is usually generated, and can cause premature foaming of the material, if the decomposition temperature of the blowing agent is too low.

Thus, there has been described a method for inflating tires with foamable rubber used to fill a pneumatic tire, making it deflation-proof and more durable.

While certain representative embodiments and details have been shown for the purpose of illustrating the invention, it will be apparent to those skilled in the art that various changes and modifications may be made therein without departing from the spirit or scope of the invention.

What is claimed is:

1. A method of inflating tires with foamable elastomeric material comprising the steps of:
    a. at least partially filling the cavity of a previously molded and vulcanized tire with unfoamed, uncured, foamable elastomeric material selected from a group of natural rubber, polyisoprene, ethylene-propylene terpolymer, polybutadiene, silicone polymer, styrene-butadiene, neoprene, acrylonitrile, and chlorosulfonated polyethylene;
    b. mounting the tire with the material on a wheel rim;
    c. placing the tire, mounted on the wheel rim, in a chamber sealed from the ambient atmosphere;
    d. circulating steam at a temperature in the range of from 212°F. to 400°F., within the chamber in contact with the tire and rim for a predetermined desired period of time;
    e. releasing the steam from within the chamber and maintaining the atmosphere surrounding the tire and rim substantially free of elemental oxygen for a predetermined desired period of time to let the material within the tire cavity at least partially foam; and
    f. recirculating steam at a temperature in the range of from 212°F. to 400°F. within the chamber to again contact the tire and rim, the steps (e) of releasing the steam, and (f) of recirculating steam being repeated, if necessary, until the material within the tire is foamed and cured.

2. The method of claim 1, wherein the steam is at a temperature in the narrower range of from 260°F. to 325°F.

3. The method of claim 2, wherein steam is at a temperature of 300°F.

4. The method of claim 1, wherein the material is polyisoprene.

5. The method of claim 1, wherein the material includes a blowing agent comprising N,N'-dimethyl-N,N'-dinitrosoterephthalate.

6. The method of claim 1, wherein the material includes a blowing agent which begins decomposing at a temperature of 160°F.

* * * * *